(12) United States Patent
Schmieder et al.

(10) Patent No.: US 8,180,905 B2
(45) Date of Patent: May 15, 2012

(54) USER-MODE BASED REMOTE DESKTOP PROTOCOL (RDP) ENCODING ARCHITECTURE

(75) Inventors: Wilhelm R. Schmieder, Issaquah, WA (US); Nelamangal Krishnaswamy Srinivas, Sammamish, WA (US); Costin Hagiu, Sammamish, WA (US); Nadim Y. Abdo, Redmond, WA (US); Vladimir K. Stoyanov, Redmond, WA (US); Ahmed M. Tolba, Redmond, WA (US); Gautam Swaminathan, Kirkland, WA (US); Srinivasa Reddy Neerudu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 12/331,298

(22) Filed: Dec. 9, 2008

(65) Prior Publication Data

US 2010/0146127 A1 Jun. 10, 2010

(51) Int. Cl.
*G06F 15/16* (2006.01)
*G06F 15/173* (2006.01)
(52) U.S. Cl. ........................ 709/228; 709/238
(58) Field of Classification Search .................... 709/228
See application file for complete search history.

(56) References Cited

U.S. PATENT DOCUMENTS

| 6,278,478 | B1 | 8/2001 | Ferriere | |
|---|---|---|---|---|
| 7,099,948 | B2 * | 8/2006 | Tormasov et al. | 709/229 |
| 7,219,354 | B1 * | 5/2007 | Huang et al. | 719/328 |
| 7,275,212 | B2 | 9/2007 | Leichtling | |
| 7,461,144 | B1 * | 12/2008 | Beloussov et al. | 709/223 |
| 7,475,419 | B1 * | 1/2009 | Basu et al. | 726/2 |
| 2003/0093568 | A1 * | 5/2003 | Deshpande | 709/247 |
| 2004/0015723 | A1 * | 1/2004 | Pham et al. | 713/201 |
| 2004/0107286 | A1 * | 6/2004 | Larson et al. | 709/229 |
| 2006/0069797 | A1 | 3/2006 | Abdo et al. | |
| 2006/0080382 | A1 * | 4/2006 | Dutta et al. | 709/203 |
| 2006/0085550 | A1 * | 4/2006 | Schmieder et al. | 709/230 |
| 2006/0087512 | A1 * | 4/2006 | Schmieder et al. | 345/522 |
| 2007/0046980 | A1 | 3/2007 | Coleman et al. | |
| 2007/0050471 | A1 | 3/2007 | Patel et al. | |
| 2007/0174410 | A1 | 7/2007 | Croft et al. | |
| 2007/0244966 | A1 | 10/2007 | Stoyanov et al. | |
| 2008/0201481 | A1 | 8/2008 | Patwardhan et al. | |
| 2009/0217358 | A1 * | 8/2009 | Kumar et al. | 726/5 |

OTHER PUBLICATIONS

Zhang, L., "Implementing Remote Display on Commodity Operating Systems," http://MVIR-0339 /325346.01www.ncl.cs.columbia.edu/publications/zhangthesis.pdf, Jan. 2006, 1-52.
"Microsoft Windows NT Server 4.0, Terminal Server Edition," http://MVIR-0339 / 325346.01msdn.microsoft.com/en-us/library/ms811522.aspx, Jun. 1998, 1 page.

* cited by examiner

*Primary Examiner* — Jeffrey Pwu
*Assistant Examiner* — Shaq Taha
(74) *Attorney, Agent, or Firm* — Woodcock Washburn LLP

(57) ABSTRACT

Techniques are disclosed for a user-mode based remote desktop protocol (RDP) encoding architecture. A user mode desktop application and user mode virtual channel application run in user-mode session space. Virtual channel data from the virtual channel application is marshaled and sent to a RDP encoder process in user-mode system space. There it is converted to RDP protocol data units (PDU) and sent to a remote client across a communications network. Graphics data from the desktop application is sent to a display driver in kernel-mode session space and then to a graphics reflector that marshals the graphics data and sends it to the RDP encoder for a similar transformation.

20 Claims, 4 Drawing Sheets

USER-MODE BASED REMOTE DESKTOP PROTOCOL (RDP) ENCODING ARCHITECTURE

BACKGROUND OF THE INVENTION

Some operating systems in the Windows family provide facilities through which a user can interact remotely with the user interface belonging to applications that are running on another computer. Such facilities are known as remote desktop or terminal services. An example of such a facility is WINDOWS TERMINAL SERVER™ or a remote desktop protocol (RDP) device. These facilities have shortcoming as a result of the fact that the code responsible for the RDP protocol encoding is implemented by a set of kernel mode drivers. These kernel mode drivers have typically been used because such a driver can easily access the data that is to be encoded into a protocol. However, such drivers are hard to service and are very difficult to develop, maintain or extend in functionality. To that end, these limitations can be mitigated if the facilities are implemented in a user mode process.

SUMMARY

An embodiment of the present invention comprises a user-mode based remote desktop protocol (RDP) encoding architecture. In this embodiment, data is extracted from a session space process and marshaled over to a system space user-mode process for the purpose of being encoded. In this embodiment, processes execute in each of user-mode session space, kernel-mode session space, and user-mode system space.

Graphics data from a user mode desktop application operating in user-mode session space is sent through a display driver operating in kernel-mode session space. That driver sends the graphics data to a graphics reflector in kernel-mode session space that marshals the data and sends it to a RDP encoder process in user-mode system space.

Likewise, virtual channel data from a user mode virtual channel application operating in user-mode session space is sent through a virtual channel reflector in user-mode session space that marshals the data and sends the marshaled virtual channel data to the RDP encoder process.

The RDP encoder process takes both of these types of data, encodes it into RDP protocol data units (PDU), and sends those units to a client that has a corresponding RDP session with the computer on which this technique is executed.

This solution provides the mechanisms and architecture for efficiently marshaling the graphics data interface (GDI) and virtual channel data from the session space to a process running in user-mode context in the system space. This enables a terminal services implementation where the protocol encoding is implemented in a single, machine-wide, user-mode component.

These techniques may be applied to a session running on a single operating system (OS), or to a session that is running on a guest OS within a virtual machine (VM) hosted by that OS on a host machine that has a host OS. Where it is the latter embodiment, the techniques may be applied to a plurality of such guest OSes.

In an embodiment, graphics data is marshaled through a low overhead shared memory mechanism and virtual channel data is marshaled through named pipes. Named pipes may be used in order to preserve the semantics for any existing terminal server virtual channel application programming interfaces (APIs), while the typically faster shared memory mechanism may be used where such named pipes are not necessary to preserve such semantics.

The above techniques allow graphics and data output to be controlled through a single user-mode system space process (the RDP encoder process) that does not depend on a device driver interface or session application threads. That is, the number of threads used to implement these techniques may be known, limited and kept at a performance-optimized number.

Systems, methods, and computer readable storage media that perform the above and similar processes are disclosed.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
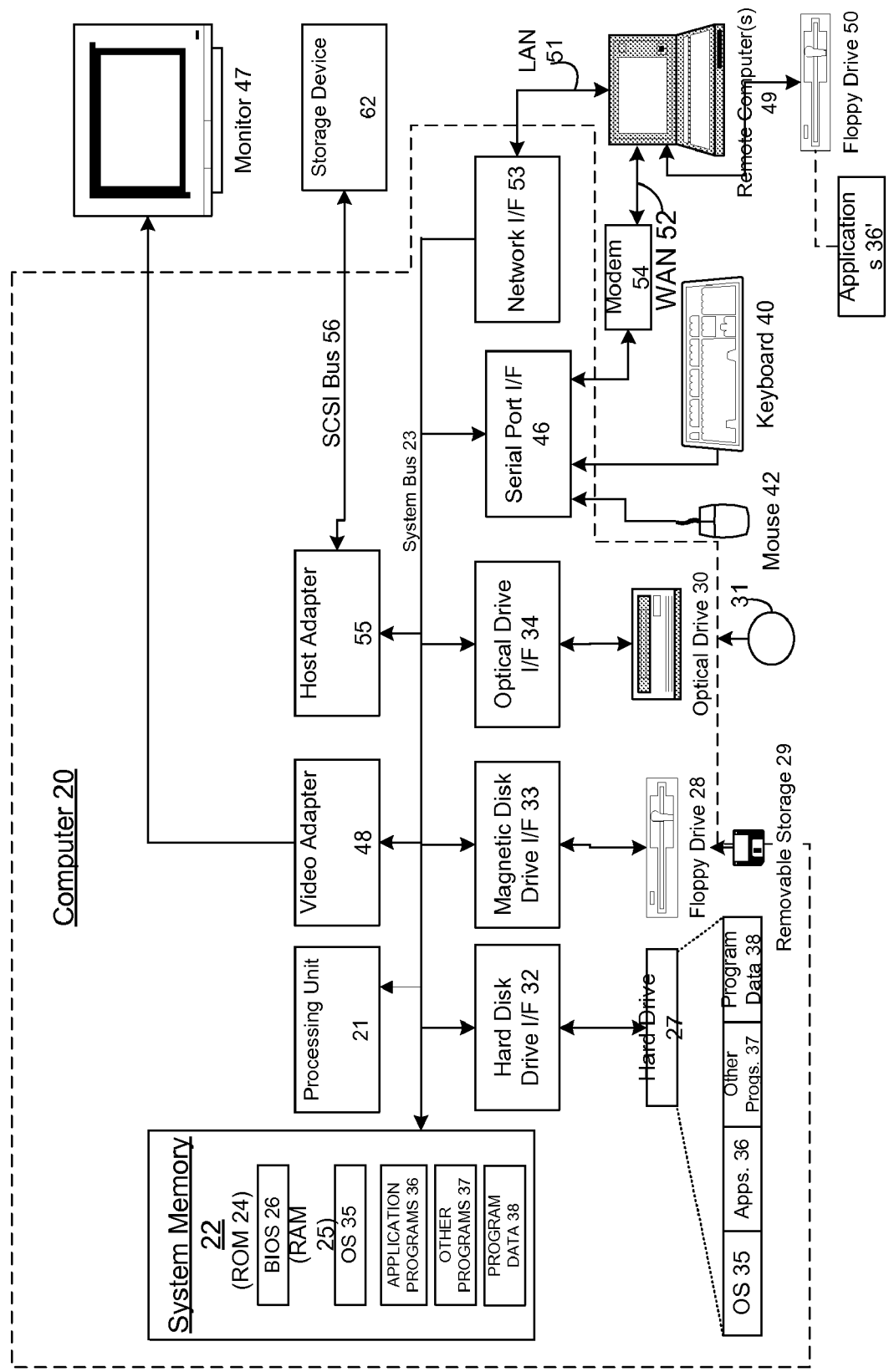
FIG. 1 depicts an example computer system wherein aspects of the present disclosure can be implemented.

Embodiments of the present disclosure may execute on one or more computers. FIG. 1 and the following discussion are intended to provide a brief general description of a suitable computing environment in which the disclosure may be implemented. One skilled in the art can appreciate that some or all of the components of the computer system of FIG. 1 can be used to effectuate the computers of FIGS. 2, 3 and 3A.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Figure 2:
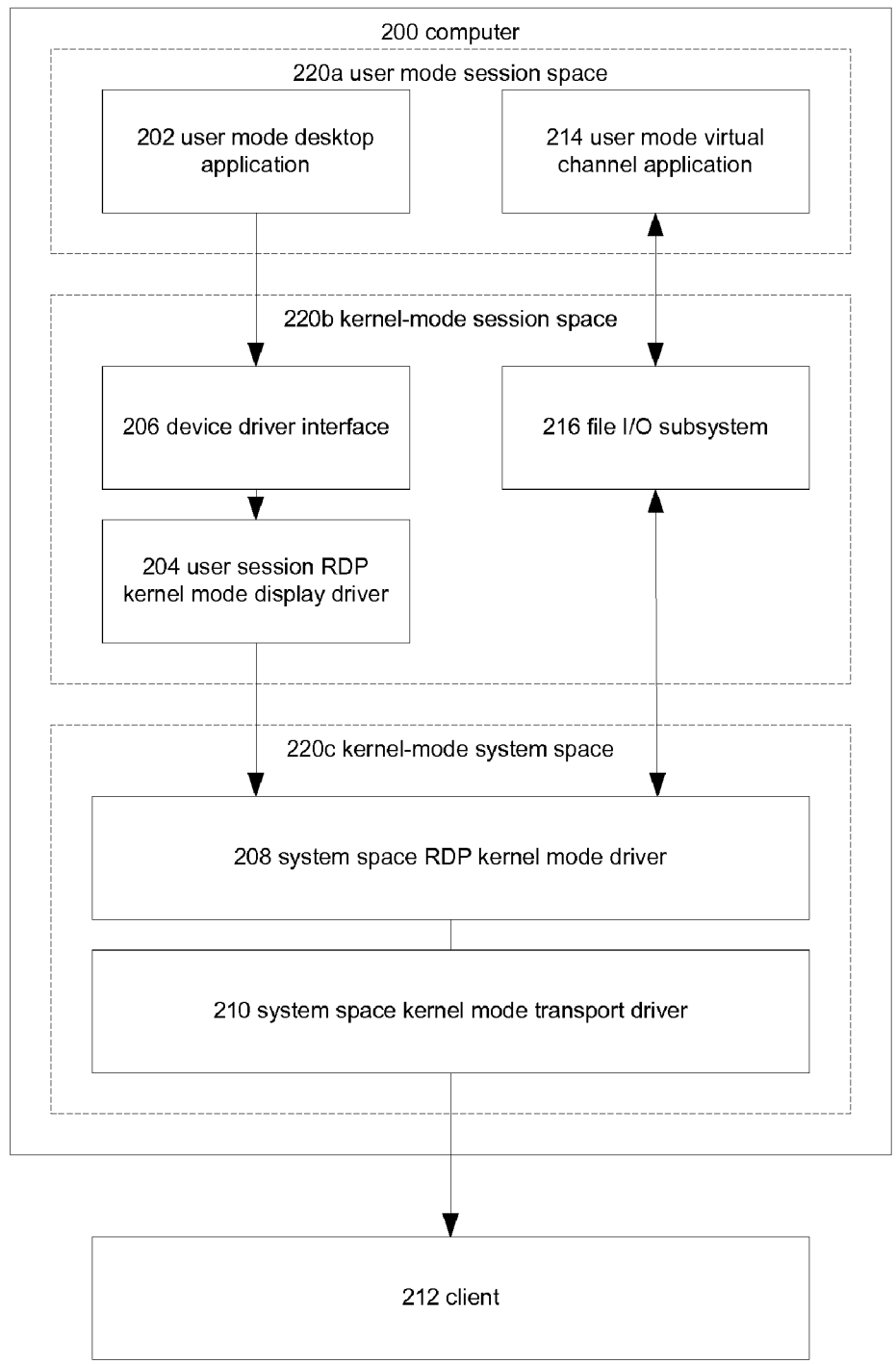
FIG. 2 depicts an example of a kernel mode-based terminal services architecture.

FIG. 2 depicts an example of a kernel mode-based terminal services architecture.

In these embodiments, processes execute in each of user-mode session space, kernel-mode session space, and kernel-mode system space. Kernel-mode space is typically memory space reserved for running the kernel, kernel extensions and some device drivers. User-mode space is typically memory where all user mode applications execute. Session space is memory space reserved for a particular user session. System space is memory reserved for the system for as long as the system is operating. Kernel-mode or user-mode space may be combined with session or system space to produce, the spaces above, such as user-mode system space. Other embodiments may utilize user-mode system space.

An application in user-mode session space 202, such as a word processor or web browser first generates graphics data. Where the application 202 is a word processor, this graphics data may be text or an image to be displayed on the screen in a particular alignment, such as centered and bolded on a page of the document being edited. This graphics data is then sent to a device driver 204 in accordance with a device driver interface (DDI) 206 for processing. The driver 204 and DDI 206 exist in kernel-mode session space. A device driver is a component or computer program that allows a high-level computer program, such as a word processor, to communicate with a hardware device, such as a computer printer or a computer monitor. The driver 204 typically communicates with the associated hardware through a communications subsystem of the computer to which the hardware is physically connected. The corresponding DDI 206 is a form of an application programming interface (API) that is specific to the driver. The program 202 makes a call in accordance with the DDI 206, which is translated by the DDI 206 and the driver 204 into a communication understood by the corresponding hardware. The DDI 206 and driver 204 make a similar transform when receiving communications from the hardware for the program 202.

In an embodiment, the DDI 204 may comprise the Graphics Device Interface (GDI), an API for MICROSOFT WINDOWS™ that represents graphical objects and transmits them to output devices like monitors and printers. GDI performs tasks such as drawing lines and curves, rendering fonts, and handling palettes. In other embodiments, the DDI 204 may comprise an interface that supports DirectX (DX) or Desktop Window Manager (DWM).

In the embodiment where the graphics data is to be sent across a communications network via a remote desktop protocol (RDP), the driver 204 partially encodes the received data into at least one RDP graphics protocol data unit (PDU). A RDP PDU is a unit of data that is specified in the RDP protocol. The driver 204 then sends each RDP PDU to a system-space kernel mode driver 208 that implements the rest of the encoding. This system-space kernel mode driver 208 exists in kernel-mode system space. The encoding may comprise both compression and encryption. After the system-space kernel mode driver 208 encodes a PDU, it sends the PDU to a lower-level kernel transport driver 210. This kernel transport driver 210 exists in kernel-mode system space. The kernel transport driver 210 sends the PDU to the intended recipient 212 of the PDU. For instance, where a user on a client machine 212 has a RDP session with the present machine, the kernel transport driver 210 sends the PDU to the client 212 in accordance with RDP across a communications network.

Similar to the user mode desktop application 202, a user mode virtual channel application 214 may exist in user-mode session space. A virtual channel application 214 may be, for instance, a remote clipboard where a user on a remote client machine 212 communicating with the present machine 200 may copy text or images on another application running in the same session (such as the desktop application 202) to a remote clipboard and then paste the copied data into another document. Such virtual channel data is sent directly through a file input/output (I/O) subsystem driver 216 that exists in kernel-mode session space. Similar as to how the device driver 204 processed its received data into at least one RDP PDU, the I/O subsystem 216 may apply framing, compression and encryption to the virtual channel data received to produce at least one RDP PDU, and send each PDU to the system space RDP kernel mode driver 208. The RDP kernel mode driver 208 sends each PDU to the system space kernel mode transport driver 210, which sends the PDU to the intended recipient 212 of the PDU.

This system of FIG. 2 allows for data to travel through the stack without any explicit marshaling. This produces a simple kernel mode based RDP encoding architecture that does not require complex data handling and marshaling. This architecture is limited in that the encoding code runs in kernel mode.

Figure 3:
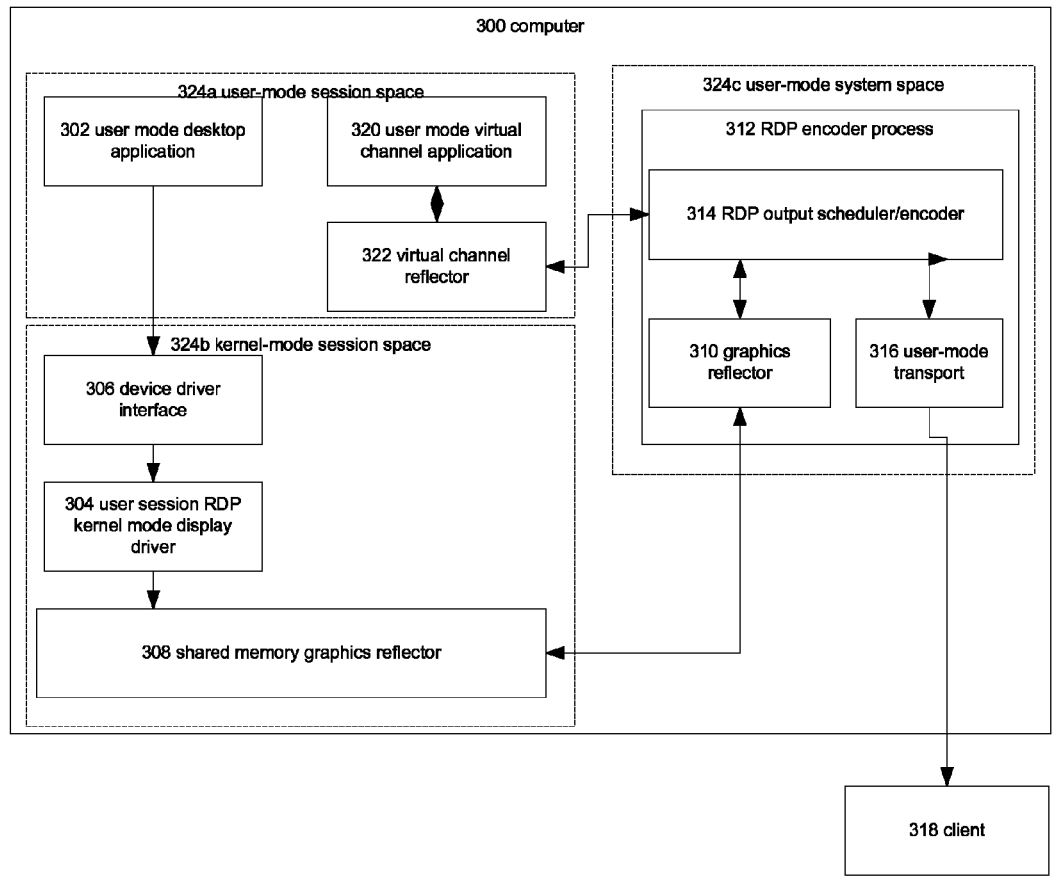
FIG. 3 depicts an example of a user mode-based terminal services architecture.

FIG. 3 depicts a contrasting system to FIG. 2 of an example of a user mode-based terminal services architecture.

In this embodiment, both the user mode desktop application 302 and the user mode virtual channel application 320 exist in user-mode session space.

The user mode desktop application 302, such as a word processor or web browser first generates graphics data. Where the application 302 is a word processor, this graphics data may be text or an image to be displayed on the screen in a particular alignment, such as centered and bolded on a page of the document being edited. This graphics data is then sent to a device driver 304 in accordance with a device driver interface (DDI) 306 for processing. The driver 304 and DDI 306 exist in kernel-mode session space. A device driver is a component or computer program that allows a high-level computer program, such as a word processor, to communicate with a hardware device, such as a computer printer or a computer monitor. The driver 304 typically communicates with the associated hardware through a communications subsystem of the computer to which the hardware is physically connected. The corresponding DDI 306 is a form of an application programming interface (API) that is specific to the driver. The program 302 makes a call in accordance with the DDI 306, which is translated by the DDI 306 and the driver 304 into a communication understood by the corresponding hardware. The DDI 306 and driver 304 make a similar transform when receiving communications from the hardware for the program 302.

In an embodiment, the DDI 304 may comprise the Graphics Device Interface (GDI), an API for MICROSOFT WINDOWS™ that represents graphical objects and transmits them to output devices like monitors and printers. GDI performs tasks such as drawing lines and curves, rendering fonts, and handling palettes.

In the embodiment where the graphics data is to be sent across a communications network via a remote desktop protocol (RDP), the driver 304 partially encodes the received data into at least one command that can be understood by the RDP encoder process. A The driver 306 sends each command to a shared memory graphics reflector 308 that exists in kernel mode session space. The shared memory graphics reflector 308 comprises a memory that may be simultaneously accessed by multiple programs with an intent to provide communication among them. This shared memory graphics reflector 308 marshals all received data and sends it to a graphics reflector 310 in user-mode system space. The reflectors ensure that a normally complex task of exchanging data between the user session space and the system space proceeds in an efficient manner.

Marshaling is the process of transforming the memory representation of an object to a data format suitable for storage or transmission, and is typically used when data must be moved between different parts of a computer program or from one program to another. The opposite operation is known as "unmarshaling."

The two reflectors here 308, 310 communicate based on shared memory mapped between a kernel mode session space driver (the shared memory graphics reflector 310) and a user mode system space process (the graphics reflector 310).

In an embodiment, the graphics reflector 310 is part of a RDP encoder process 312 along with a RDP output scheduler and encoder 314 and a user mode transport 316. The RDP encoder process 312 exists in user-mode system space.

The graphics reflector 310 takes the received graphics data and sends it to the RDP output scheduler and encoder 314. As depicted in FIG. 2, the kernel mode architecture encodes the RDP data and sends it across a network using the actual threads of the applications that produced that data. In most cases, those applications were being blocked while the data was encoded. In the user mode architecture depicted by FIG. 3, the encoding is performed by the RDP output scheduler and encoder component 314. The output scheduler component 314 is responsible for consuming the virtual channel data and the graphics marshaled data and encoding that data on its own set of threads into the RDP format. This architecture allows the encoding for each RDP session present on the machine to be performed by a single component on a finite and optimal set of threads.

When the RDP output scheduler and encoder 314 has encoded the received graphics data into at least one RDP PDU, it sends each PDU to the user-mode transport 316. The user-mode transport 316 sends the PDU to the intended recipient 318 of the PDU. For instance, where a user on a client machine 318 has a RDP session with the present machine, the user-mode transport 316 sends the PDU to the client 318 in accordance with RDP across a communications network.

Similar to the user mode desktop application 302, the user mode virtual channel application 320 may exist in user-mode session space. A virtual channel application 320 may be, for instance, a remote clipboard where a user on a remote client machine 318 communicating with the present machine 300 may copy text or images on another application running in the same session (such as the desktop application 302) to a remote clipboard and then paste the copied data into another document. Such virtual channel data is sent from the user mode virtual channel application 320 through a virtual channel reflector 322 to the RDP output scheduler and encoder 314. The virtual channel reflector 322 marshals the received virtual channel data and sends corresponding marshaled virtual channel data to the RDP output scheduler and encoder 314.

In an embodiment, the virtual channel reflector 322 uses named pipes and named pipe handles. A named pipe may be used for inter-processes communication, such as done by the virtual channel reflector 322. A named pipe is an API that provides a system-persistent inter-process communications (IPC) channel for a plurality of processes to communicate to each other and usually appears as a file to a process. A process generally attaches to a named pipe to perform an inter-process communication with another process. In an embodiment, a named pipe stores and fetches data in memory and retrieves it when requested. A named pipe handle is a handle to a named pipe.

By using named pipe handles, the I/O operations on channel handles are compatible with the pre-existing terminal server API, such as the WINDOWS TERMINAL SERVER™ API. This is key to providing compatibility with current virtual channel-based applications. If named pipes were not used by the virtual channel reflector 322, then current virtual channel-based applications would be rendered inoperable as through the virtual channel reflector 322.

Similar as to how the RDP output scheduler and encoder 314 encodes graphics data received from the graphics reflector 310 into at least one RDP PDU, the RDP output scheduler and encoder 314 encodes virtual channel data received from the virtual channel reflector 322 into at least one RDP PDU. The RDP output scheduler and encoder 314 then sends each PDU to the user mode transport 316, which sends the PDU to the intended recipient 318 of the PDU.

Figure 3A:
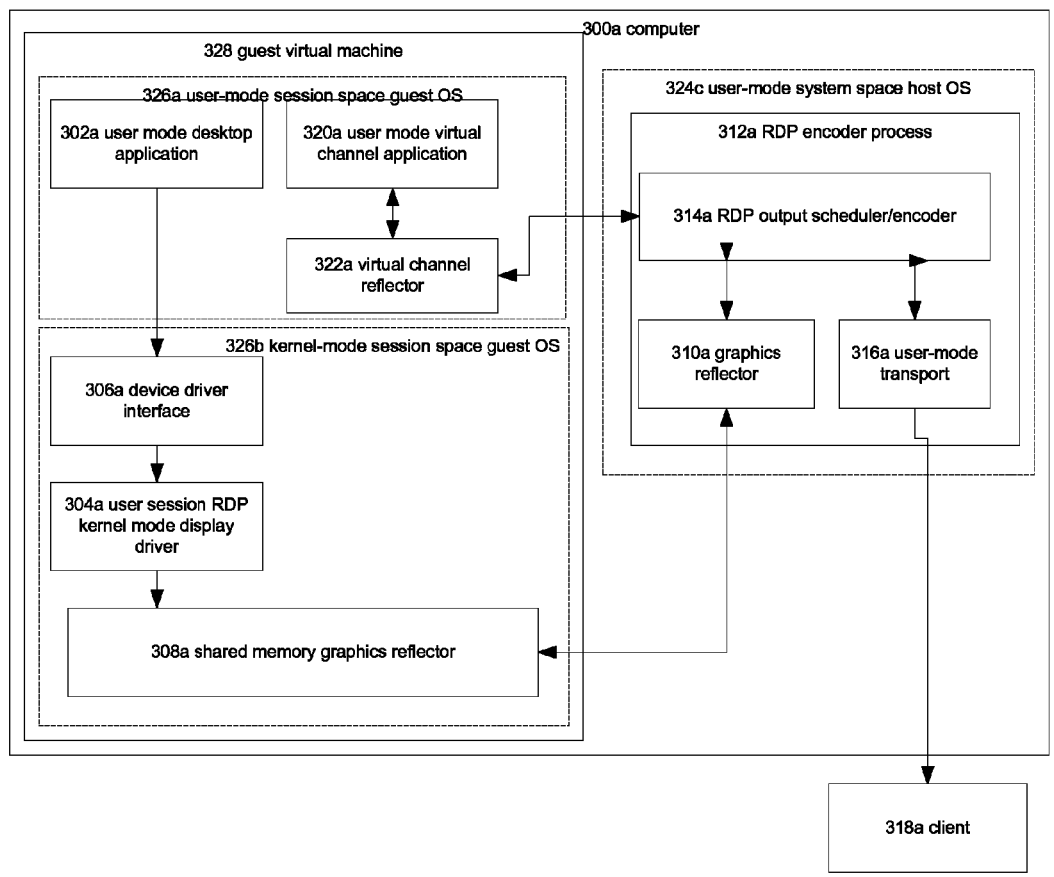
FIG. 3A depicts another example of a user mode-based terminal services architecture.

FIG. 3A depicts an implementation of the system of FIG. 3 where graphics and virtual channel data is produced by a virtual machine (VM) running on the system. The data is collected through reflectors 308a, 310a, 322a from a user session running in a guest that runs on the VM 328 and is sent over for encoding to a RDP encoder process 312a running in a host OS on the machine 300a. In this embodiment, the host OS encoder process 312a can encode data that arrives from a plurality of VMs. The implementation for the reflector components 308a, 310a, 322a in this embodiment is based on mechanisms specific for host-guest data exchange. The graphics reflector 308a, 310a can use memory shared between a guest and the host, while the VC reflector can utilize a VM bus (VMBUS) 322a. In this embodiment, the user mode desktop application 302a and the user mode virtual channel application 320a execute in the guest OS's user mode session space 326a. The device driver interface 306a, and the user session DRP kernel mode display driver 304a execute in the guest OS's kernel-mode session space 326b. Additionally, the RDP encoder process 312a executes in the host OS's user-mode system space 324c.

Some components were necessarily omitted from the above figures for the sake of clarity and brevity. For instance, the transmission control protocol (TCP) or transport listeners may be different between the implementation of FIG. 2 and FIGS. 3 and 3A. The TCP listener in a kernel mode architecture of FIG. 2 uses a kernel mode listener while the TCP listener of FIGS. 3 and 3A use a user mode-based listener. A similar approach is taken to the components for handling the input injections. One skilled in the art will appreciate other ancillary differences between the implementation of FIG. 2 and FIGS. 3 and 3A.

What is claimed:

1. A method for encoding graphics data in the user-mode address space of a computer, comprising:
    sending graphics data corresponding to a request from a client from a user application executing in user-mode session space to a display driver executing in kernel mode;
    converting the graphics data by the display driver into at least one graphics command in a format understandable by a RDP encoder process, the at least one graphics command in a format understandable by the RDP encoder process comprising a protocol data unit (PDU);
    marshaling the PDU;
    sending the marshaled PDU across a graphics reflector, the graphics reflector comprising shared memory, from the display driver executing in kernel mode to the RDP encoder processes executing in user-mode system space;
    unmarshaling the PDU;
    compressing, by the RDP encoder process, the PDU; and
    sending the compressed PDU from the RDP encoder processes to the client over a communications network.

2. The method of claim 1, wherein the graphics data is sent to the RDP encoder process via a shared memory mechanism.

3. The method of claim 2, further comprising: transforming a memory representation of the graphics data prior from a first format to a second format to sending it to the RDP encoder process.

4. The method of claim 1, wherein the user application executes in a user-mode session space of a guest operating system (OS) executing on a virtual machine (VM) of the computer, and the display driver executes in a kernel-mode session space of the guest OS.

5. The method of claim 1, wherein the display driver executes in kernel-mode session space.

6. The method of claim 1, wherein the graphics data comprises data in Graphics Device Interface (GDI) format, Desktop Window Manager (DWM) format, or DirectX (DX) format.

7. The method of claim 1, further comprising:
sending virtual channel data corresponding to a request from the client from a virtual channel application executing in user-mode session space to the RDP encoder process, without sending the virtual channel data to a kernel-mode process; and
sending the virtual channel data from the RDP encoder processes to the client over a communications network.

8. The method of claim 7, wherein the virtual channel data is sent to the RDP encoder process via a named pipe.

9. The method of claim 8, further comprising: transforming a memory representation of the virtual channel data from a first format to a second format prior to sending it to the RDP encoder process.

10. The method of claim 7, wherein the virtual channel data comprises text or image data copied to a clipboard from the user application.

11. The method of claim 1, wherein the RDP encoder process performs at least one from a set on the graphics data, the set comprising: framing the graphics data, and encrypting the graphics data.

12. The method of claim 1, further comprising: encoding the graphics data by the display driver into at least one command that can be understood by the RDP encoder process before sending it to the RDP encoder process.

13. A system for encoding graphics data in the user-mode address space of a computer, comprising:
a processor; and
a memory communicatively coupled to the processor when the system is operational, the memory bearing processor-executable instructions that, when executed on the processor, cause the system to at least:
send graphics data corresponding to a request from a client from a user application executing in user-mode session space to a display driver executing in kernel mode;
convert the graphics data by the display driver into at least one graphics command in a format understandable by a RDP encoder process, the at least one graphics command in a format understandable by the RDP encoder process comprising a protocol data unit (PDU);
marshal the PDU;
send the marshaled PDU across a graphics reflector, the graphics reflector comprising shared memory, from the display driver executing in kernel mode to the RDP encoder processes executing in user-mode system space;
unmarshal the PDU;
compress, by the RDP encoder process, the PDU; and
send the compressed PDU from the RDP encoder processes to the client over a communications network.

14. The system of claim 13, wherein the memory further bears processor-executable instructions that, when executed on the processor, causes the system to at least:
receive virtual channel data from a virtual channel application executing in user-mode session space, without the virtual channel data being sent through a kernel-mode process, encode the virtual channel data, and transmit the encoded virtual channel data across the communications network to the client.

15. The system of claim 14, wherein the memory further bears processor-executable instructions that, when executed on the processor, causes the system to at least:
receive the virtual channel data across a virtual channel reflector, the virtual channel reflector comprising a named pipe.

16. The system of claim 13, wherein the memory further bears processor-executable instructions that, when executed on the processor, causes the system to at least:
receive the graphics data across a graphics reflector, the graphics reflector comprising a shared memory.

17. The system of claim 13, wherein the user application executes in a user-mode session space of a guest operating system (OS) executing on a virtual machine (VM) of the computer, and the display driver executes in a kernel-mode session space of the guest OS.

18. The system of claim 13, wherein the encoded graphics data comprises graphics data in a remote desktop protocol (RDP) format.

19. A tangible computer-readable storage medium, bearing computer-readable instructions for encoding graphics data in the user-mode address space of a computer, that upon execution by a computer, cause the computer to perform comprising:
sending graphics data corresponding to a request from a client from a user application executing in user-mode session space to a display driver executing in kernel mode;
converting the graphics data by the display driver into at least one graphics command in a format understandable by a RDP encoder process, the at least one graphics command in a format understandable by the RDP encoder process comprising a protocol data unit (PDU);
marshaling the PDU;
sending the marshaled PDU across a graphics reflector, the graphics reflector comprising shared memory, from the display driver executing in kernel mode to the RDP encoder processes executing in user-mode system space;
unmarshaling the PDU;
compressing, by the RDP encoder process, each PDU;
sending the compressed PDU from the RDP encoder processes to the client over a communications network;
marshaling virtual channel data corresponding to a request from the client from a virtual channel application executing in user-mode session space;
sending the marshaled virtual channel data to the RDP encoder process across a virtual channel reflector, the virtual channel reflector comprising a named pipe;
unmarshaling the virtual channel data;
converting the virtual channel data into at least one virtual channel RDP PDU;
compressing each virtual channel RDP PDU; and
sending each compressed virtual channel RDP PDU from the RDP encoder processes to the client over a communications network.

20. The tangible computer-readable storage medium of claim 19, wherein the user application executes in a user-mode session space of a guest operating system (OS) executing on a virtual machine (VM) of the computer, and the display driver executes in a kernel-mode session space of the guest OS.

* * * * *